United States Patent [19]

Ward

[11] Patent Number: 5,573,206

[45] Date of Patent: Nov. 12, 1996

[54] HOSE AND DROGUE BOOM REFUELING SYSTEM, FOR AIRCRAFT

[75] Inventor: Elmer F. Ward, Santa Ana, Calif.

[73] Assignee: Able Corporation, Yorba Linda, Calif.

[21] Appl. No.: 293,177

[22] Filed: Aug. 19, 1994

[51] Int. Cl.⁶ .................................................. B64D 37/16
[52] U.S. Cl. .................................. 244/135 A; 244/1 TD
[58] Field of Search ........................... 244/135 R, 135 A, 244/1 TR

[56] References Cited

U.S. PATENT DOCUMENTS

| | | | |
|---|---|---|---|
| 2,879,017 | 3/1959 | Smith | 244/135 A |
| 2,995,321 | 8/1961 | Zeitler | 244/135 A |
| 3,599,907 | 8/1971 | Ransom | 244/135 A |
| 3,747,873 | 7/1973 | Layer et al. | 244/135 A |
| 4,072,283 | 2/1978 | Weiland | 244/135 A |
| 4,129,270 | 12/1978 | Robinson | 244/135 A |
| 4,586,683 | 5/1986 | Kerker | 244/135 A |
| 4,890,751 | 1/1990 | Opdahl | 244/1 TD |

FOREIGN PATENT DOCUMENTS

| 232637 | 2/1961 | Australia | 244/135 A |
|---|---|---|---|

OTHER PUBLICATIONS

"Probing and Drogueing", Pahules, Flight vol. LXII issue 228X p. 567 Oct. 31, 1952.

Primary Examiner—Andres Kashnikow
Assistant Examiner—Virna Lissi Mojica
Attorney, Agent, or Firm—William W. Haefliger

[57] ABSTRACT

An aerial refueling system for refueling aircraft in flight from a tanker airplane, via a fuel supply hose and drogue system comprising an elongated boom having inboard and outboard end portions, and having pivotal support structure at the inboard end portion to accommodate pivoting of the boom between retracted position adjacent the airplane fuselage and extended position in which the boom projects away from the fuselage; the boom having a guide to guide endwise extension and retraction of the hose and drogue to and from aircraft refueling deployed position; and hose and drogue control structure carried by the aircraft fuselage for effecting storage, and hose and drogue endwise extension and retraction via the guide.

8 Claims, 3 Drawing Sheets

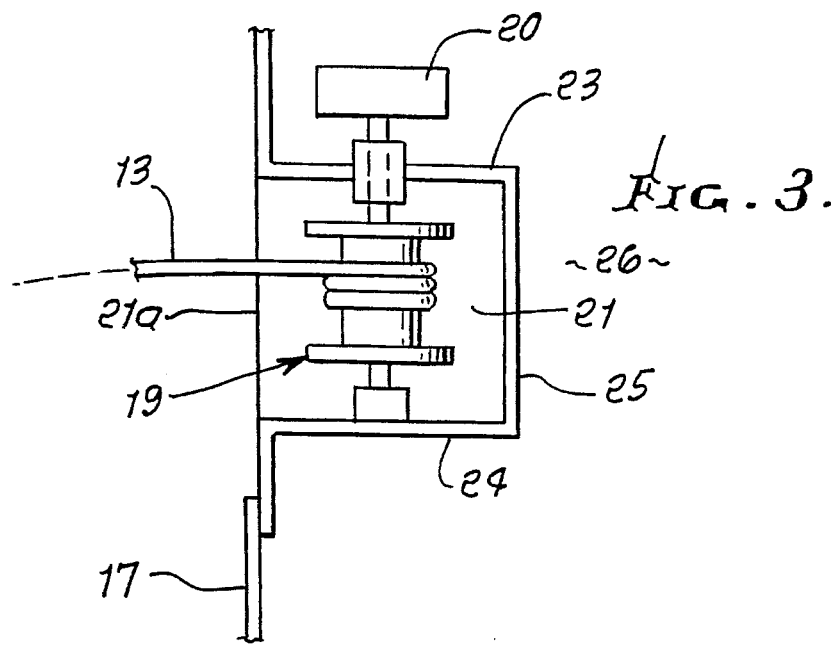
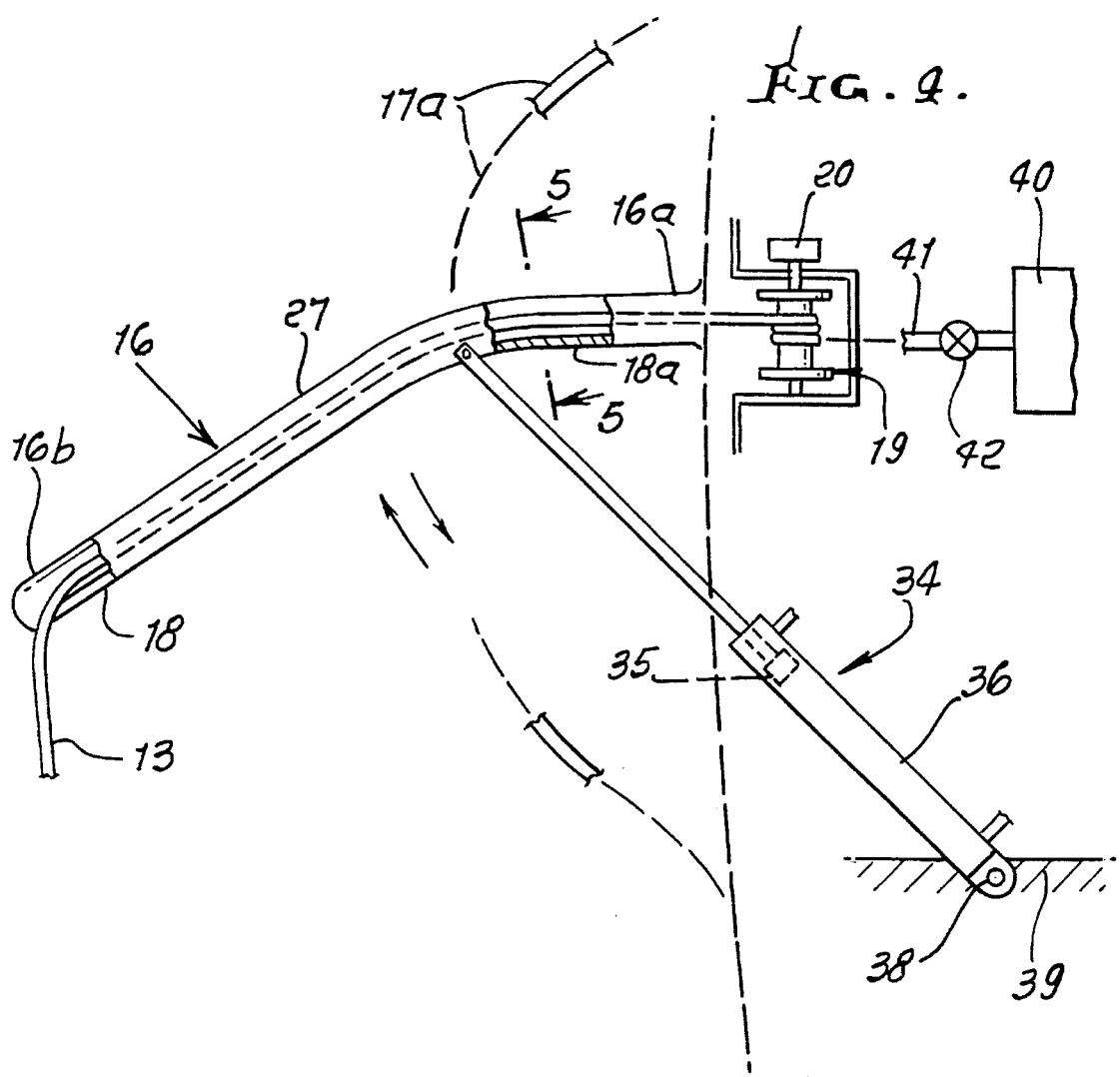

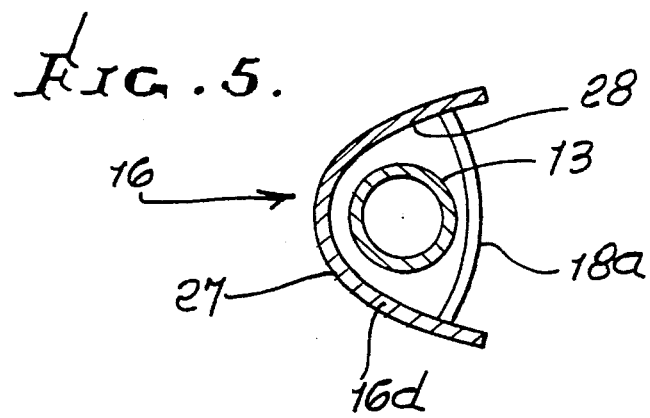
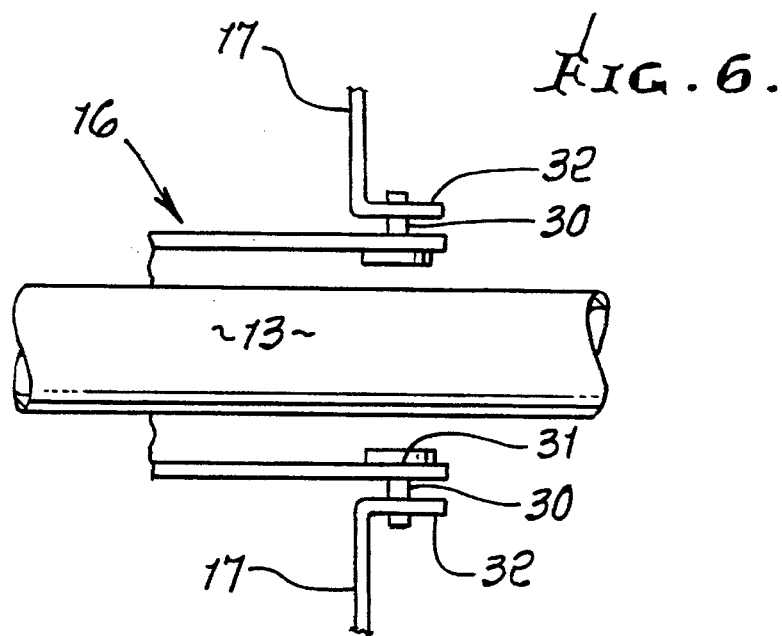
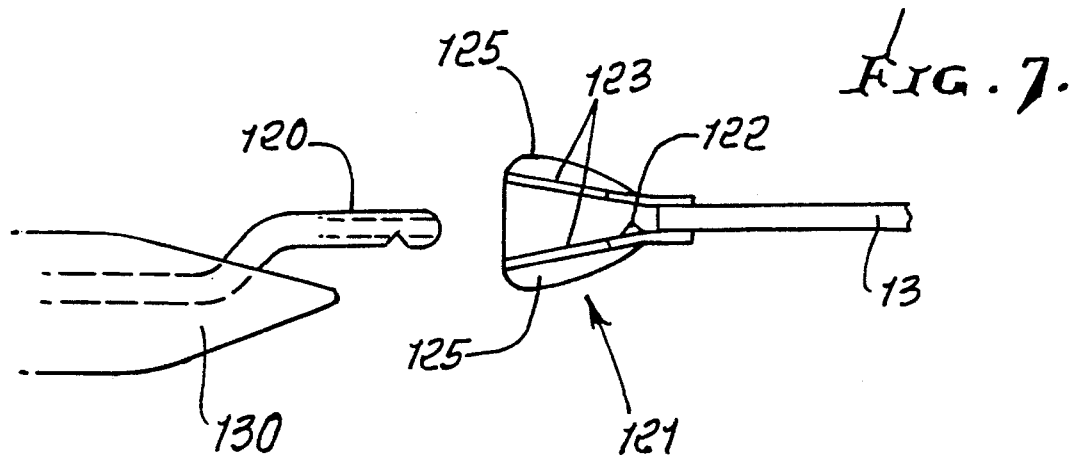

HOSE AND DROGUE BOOM REFUELING SYSTEM, FOR AIRCRAFT

BACKGROUND OF THE INVENTION

This invention relates generally to aerial refueling of aircraft from tanker airplanes, and more particularly, to improvements in aerial refueling systems that require a minimum of aircraft structural rework, which impose minimum aerodynamic drag, and that enable use of existing probe, drogue and hose components.

Two aerial refueling systems are in general use by air services of the world. The probe and drogue system is used by most air forces, including the U.S. Navy. The U.S. Air Force, which has the largest number of aerial tankers, uses an extendible boom system which is not readily adapted to probe and drogue techniques.

There is need for improvements providing the advantages listed above, and which provide for unusual advantages in structure, function and results, as will be seen.

SUMMARY OF THE INVENTION

It is a major object of the invention to provide an improved aerial refueling system that employs a hose and drogue deployable from or via a deployable boom carried by the tanker aircraft fuselage; and typically, one to three such booms may be utilized to deploy hose and drogue units. As will be seen, the system includes:

a) an elongated boom having inboard and outboard end portions, and having pivotal support means at the inboard end portion to accommodate pivoting of the boom between retracted position adjacent the airplane fuselage and extended position in which the boom projects away from the fuselage, b) the boom having a hose and drogue guide at the boom outboard end portion to guide endwise extension and retraction of the hose and drogue, to and from aircraft refueling deployed position, c) and hose and drogue control means carried by the aircraft fuselage for effecting storage of the drogue hose, and their endwise extension and retraction via the guide.

Another object is to provide a boom having a drag-reducing, elongated streamline surface for presentation in a forward direction relative to the tanker airplane direction of forward flight, during boom extension. When not in use, the boom can be rotated to be adjacent to the aircraft skin and conformally shaped to reduce drag.

Another object is to provide a guide that includes an arcuate section for passing the drogue and/or hose endwise. The drogue and hose are typically protectively retained within the boom during boom pivoting between its extended and retracted positions. Compared with conventional pylon-mounted pods located on the aircraft, the present configuration requires less structural modification of the aircraft, is simpler, produces less drag, is easier to service, and increases separation between fuel receiver aircraft. Increased separation is especially critical during a second or third receiver aircraft connect sequence, when the refueling hose or hoses is or are streaming aft from the tanker aircraft.

A further object is to provide hose and drogue deployment control means that includes a hose storage reel. That reel may be contained in a compartment isolated from the pressurized interior of the fuselage, yet within the fuselage. This overcomes the problem presented with conventionally used pods from which the hose is deployed, such pods typically being mounted external to the aircraft, which increases drag and presents difficulties as regards servicing of the deploying apparatus in the pod.

The control means may also include actuator means operatively connected with the boom for effecting the pivoting thereof.

A further object is to provide boom structure in the form of a first boom located at one side of the fuselage, there being other like booms located at the opposite side and lower side of the fuselage, whereby the booms are actuable, as for example swingable between extended and retracted positions. A second or third hose and drogue may be provided, and the additional booms may have guide means at their outboard end portions to guide extension and retraction of the second and/or third hose and drogue to and from aircraft refuel position.

These and other objects and advantages of the invention, as well as the details of an illustrative embodiment, will be more fully understood from the following specification and drawings, in which:

DRAWING DESCRIPTION

FIG. 3 is an enlarged section in elevation showing one form of hose reeling and unreeling;

FIG. 4 is an enlarged elevation showing one form of boom structure for extending and retracting a refueling hose and drogue;

FIG. 5 is a section taken on lines 5—5 of FIG. 4;

FIG. 6 is a section showing one form of boom pivoting means; and

FIG. 7 is a schematic showing of a drogue and hose positioned to receive a probe on an aircraft to be refueled.

DETAILED DESCRIPTION

Figure 1:
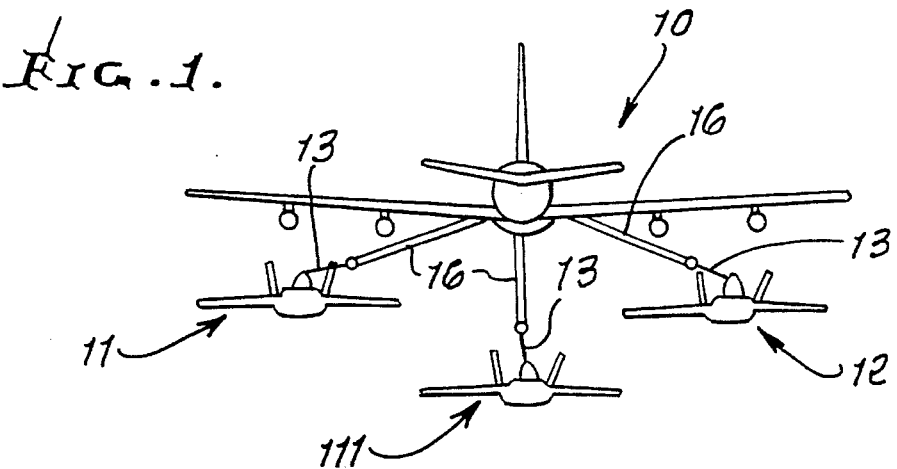
FIG. 1 is an aft elevation showing a tanker airplane in flight and refueling two fuel-receiving aircraft, in a manner in accordance with the invention.
Figure 2:
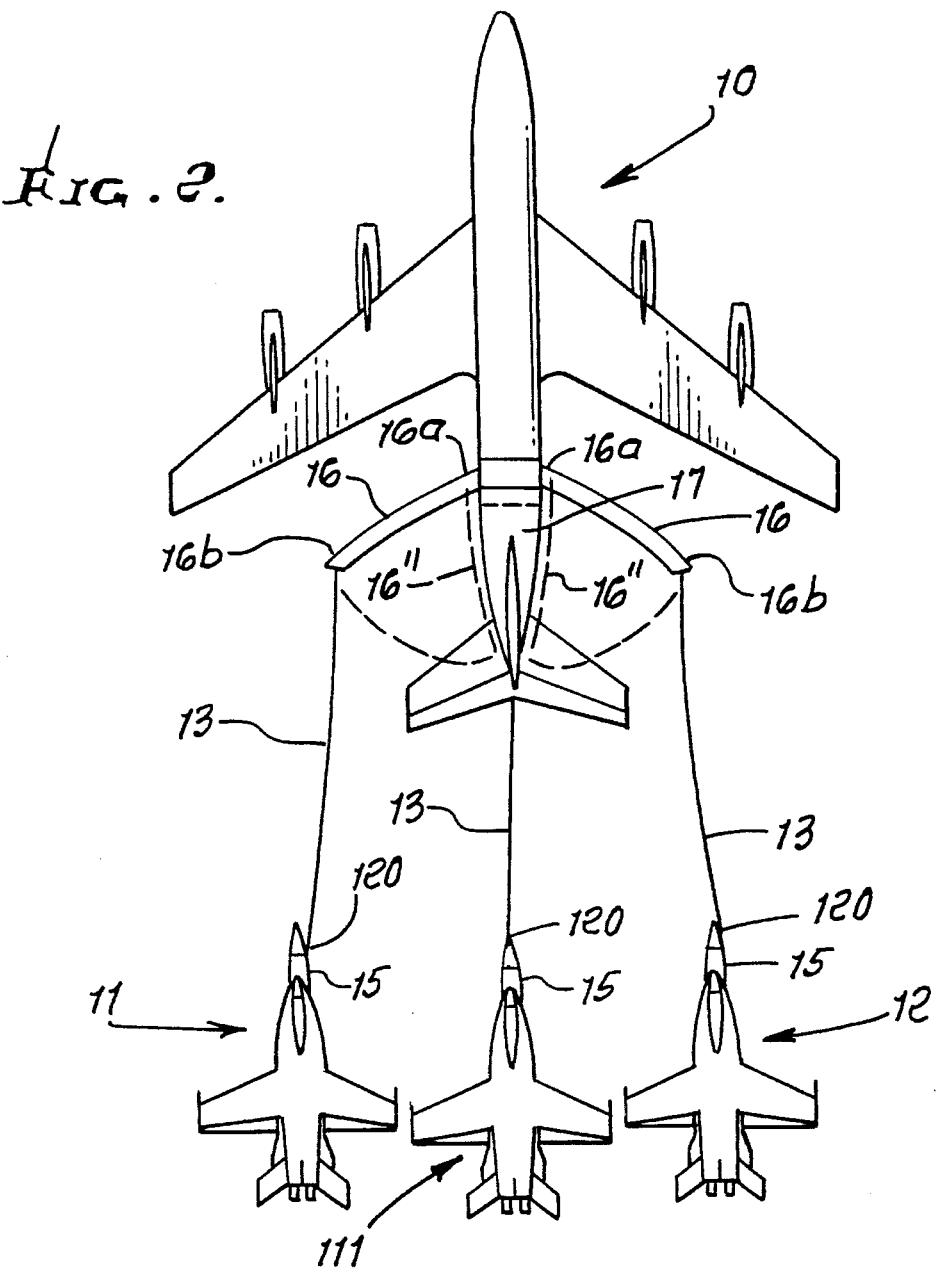
FIG. 2 is a plan view of the FIG. 1 refueling operation showing extended booms.

In FIGS. 1 and 2, a tanker airplane is shown at 10, in flight and in position for refueling other aircraft 11 and 12 generally at the rear of the tanker airplane. Refueling drogues or hoses 13 and probes 120 extend from the tanker to forward fueling inlets 15 of the aircraft 11 and 12. Such inlets may be provided by probes. A third aircraft 111 flying at a lower level may simultaneously be refueled, as shown.

Extending the description to FIGS. 3–5, an elongated boom 16 has an inboard end portion 16a and a outboard end portion 16b, two of such booms being shown one at each side of the rear extent of the fuselage 17 of the tanker airplane, and deployed outwardly from the fuselage. A third such boom 16 is shown at the rear underside of the tanker and is deployed downwardly. Pivotal support means is provided at the inboard end portion 16a of each boom to accommodate pivoting of the boom between retracted position adjacent the airplane fuselage, as indicated by broken lines 16" and extended position. In the latter position, the boom has been swung outwardly and forwardly to project sidewardly away from the fuselage, as shown in full lines.

The boom has at its outboard end portion a guide operable to guide endwise extension and retraction of the drogue and hose to and from aircraft refueling deployed position. See FIG. 7 showing a probe-receiving drogue 121 at the end of the hose. The guide or guides is or are indicated at 18 in FIG. 4; and the hose 13 extends from a reel 19 to the guide along a path shielded by the boom, as shown in FIG. 4. The guide also extends along the boom length, shielded by the boom forward surface 27. The guide may take the form of a tubular liner protectively carried by the boom. The hose is wound on the reel in such a way as to be easily deployed in response to operation of a reel drive indicated at 20. When retracted, the drogue hose also extends adjacent the outboard position of the boom, i.e., proximate the guide and shielded by the boom. When the reel is driven in unwind mode, the airstream passing over the boom tends to draw the drogue and hose outwardly and away from the boom, pulling the hose at the boom along with it under the control of the drive 20. Thus, the hose and drogue may be deployed into aircraft refuel position, as seen in FIG. 2.

Note in FIG. 3 that the hose reel 19 is carried within a compartment 21 adjacent to the side of the fuselage, but located within the fuselage, whereby streamline configuration of the fuselage is maintained. The compartment 21 may be open to the exterior after the boom is deployed to FIGS. 2 and 4 position; and the boom may cover the open side 21a of the compartment when retracted. Walls, as at 23, 24, and 25, may contain the compartment and isolate it from the fuselage interior 26, which is normally air pressurized.

It will be understood that the boom 16 has a drag-reducing elongated streamlined surface 27 seen in cross section in FIG. 5, for presentation in a forward direction relative to the tanker airplane direction of forward flight during boom extension. The guide 18 may include an arcuate section indicated at 18a in FIG. 5, and spaced from boom wall 16d, to pass the hose endwise and to retain it protectively in close proximity to the boom wall inner side 28 during boom pivoting between extended and retracted positions. Guide or liner 18 may be continuous, lengthwise of the boom.

FIG. 6 shows pivots 30 attached to the boom structure, as at 31, the pivots being carried by the fuselage frame 32, thereby to allow pivoting of the boom between extended and retracted positions. This pivot structure is representative of one form of pivoting device, other devices being usable.

FIG. 4 also shows an actuator means 34 operatively connected with the boom for effecting pivoting thereof.

As illustrated, the actuator includes a piston rod 35 and cylinder 36, which may be hydraulically or pneumatically operated to extend the piston rod, and thereby extend the boom frame. The cylinder is shown as pivotally connected at 38 to the aircraft frame 39. Upon retraction of the piston rod, the boom is retracted to collapsed position adjacent the aircraft fuselage. Other forms of actuators may be provided. The fuselage side wall may bulge outwardly at 17a to house 16a at 17a.

FIG. 4 also shows a fuel tank 40 carried by the fuselage (or by the airplane wing) and having a duct 41 connected to the hose 13 on the reel. A flow control valve is shown at 42.

As referred to, three such booms 16 and associated mechanisms, as shown in FIGS. 3–5, are provided, one at each side of the fuselage, one at the lower side of the fuselage. Thus, one to three such booms may be provided.

In FIG. 7, a forwardly projecting tubular probe 120 is carried by the fuel-receiving aircraft 130. The probe is maneuvered to enter the drogue 121 for receiving fuel from the hose 13 that carries the drogue. A coupling 122 couples the probe into the drogue, as is shown. Inner stays 123 help to guide the probe into the drogue. Drogue vanes 125 extend into the air stream to stabilize the drogue position.

Advantages of the described structure include the following:

1. The hose reel is carried within the fuselage, not in an outboard pod, which increases drag.

2. Use of a boom or booms allows increased separation between fuel receiver aircraft.

3. The boom can be rotated into retracted position adjacent the fuselage to minimize drag.

4. The boom protects the hose during hose extension and retraction.

I claim:

1. In an aerial refueling system for refueling aircraft in flight from a tanker airplane, via a fuel supply hose and drogue, the tanker having a fuselage extending lengthwise of the aircraft, the combination comprising a) an elongated boom having inboard and outboard end portions, and having pivotal support means at said inboard end portion to accommodate pivoting of the boom between retracted position directly adjacent the airplane lengthwise extending fuselage and extended position in which the boom projects away from the fuselage, b) the boom having a hose and drogue guide at said boom outboard end portion to guide endwise extension and retraction of the hose and drogue, to and from aircraft refueling deployed position, c) and hose and drogue control means carried by the aircraft fuselage for effecting storage, and hose and drogue endwise extension and retraction, via said guide, d) the boom having a drag-reducing, elongated, streamline fairing surface to face in a forward direction toward the oncoming air flow relative to the tanker airplane direction of forward flight, during boom extension and retraction, e) said control means including a hose storage reel, there being a compartment within the fuselage, said control means including a hose storage reel located within said compartment, said compartment having a side opening adjacent which the boom extends in said retracted position thereof, f) said boom pivotal support means having an axis offset from the reel.

2. The combination of claim 1 wherein said fuselage has an air pressurized interior, and said compartment has wall means sealing off said reel from communication with said fuselage interior.

3. The combination of claim 1 wherein said guide includes an arcuate section for passing the hose endwise.

4. The combination of claim 1 wherein the hose is protectively retained in close proximity to the boom during boom pivoting between said extended and retracted positions.

5. The combination of claim 1 including actuator means operatively connected with the boom for effecting said pivoting thereof.

6. The combination of claim 1 including control means operatively connected with the reel to control reel rotation and consequent deployment of the hose with the boom in extended position.

7. The combination of claim 1 wherein said boom comprises a first boom located at one side of the fuselage, there being a second and like boom located at the opposite side of the fuselage, whereby the two booms are oppositely swingable between extended and retracted positions, there being a second hose and drogue, and the second boom having second guide means at an outboard end portion of the second boom to guide extension and retraction of the second probe and drogue to and from aircraft refuel position.

8. The combination of claim 7 including a third boom located at the underside of the fuselage and deployable therefrom, and a third hose and drogue deployable via the deployed third boom into the airstream.

\* \* \* \* \*